Oct. 18, 1955  S. VINCENT  2,720,705
RULE TOOL
Filed April 10, 1953
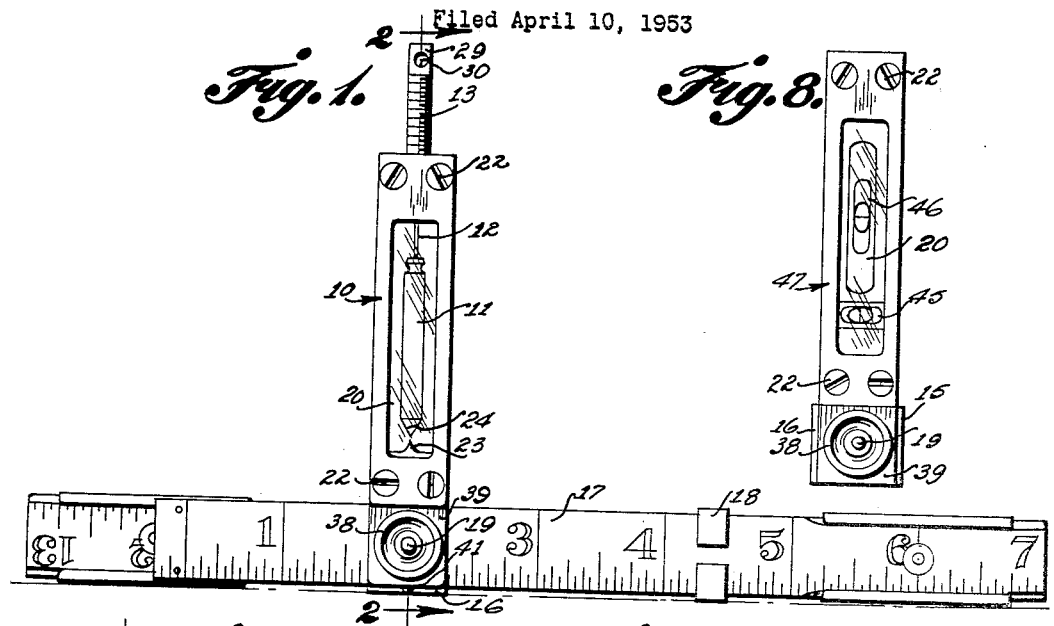
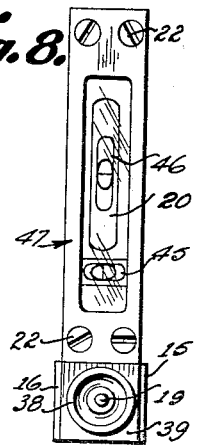
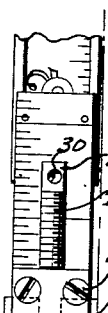
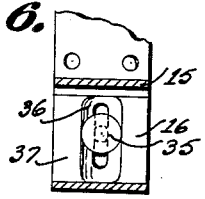
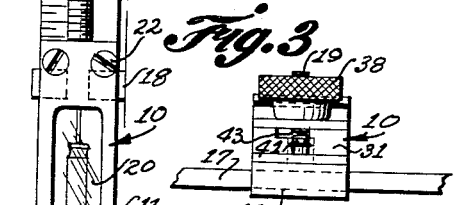
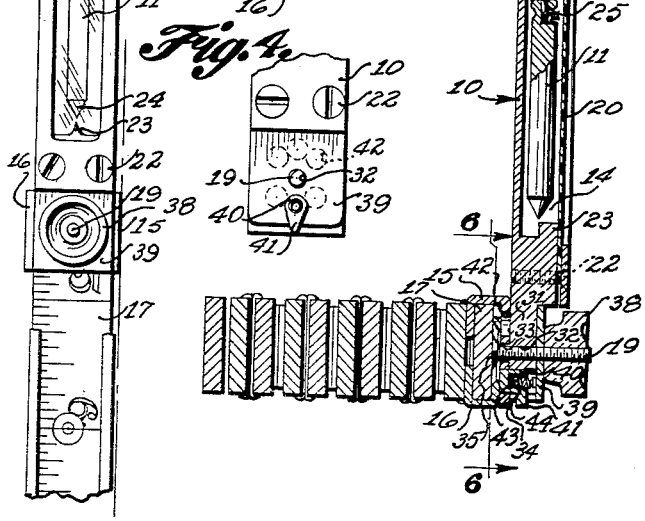
INVENTOR.
Simon Vincent
BY Victor J. Evans & Co.
ATTORNEYS

# United States Patent Office 2,720,705
Patented Oct. 18, 1955

2,720,705
RULE TOOL

Simon Vincent, Washington, D. C.

Application April 10, 1953, Serial No. 347,990

4 Claims. (Cl. 33—88)

This invention relates to combination tools, and in particular a comparatively small plumb bob or level in the form of an attachment adapted to be mounted on or used in combination with a folding rule providing leveling means and also facilitating marking or laying off angles such as the angular formations at the ends of roof rafters and the like.

The purpose of this invention is to provide leveling and angle determining means that is adapted to be carried by carpenters, millrights and the like continuously.

The conventional type of spirit level or plumb bob is comparatively large and although tools of this type are used continuously they are not adapted to be carried in a pocket. With this thought in mind this invention contemplates a plumb bob adjustably mounted in a casing adapted to be pivotally mounted on a section of a folding rule whereby, when not in use, the casing may be positioned against the outer face of a section of the rule and which may be turned to vertically disposed positions at different angles to the rule for use.

The object of this invention is, therefore, to provide means for mounting a plumb bob whereby the plumb bob may be mounted on an end section of a folding rule, and positioned against the said end section when not in use.

Another object of the invention is to provide a combination plumb bob and folding rule in which means is provided for engaging a surface at two points to facilitate holding the device parallel to a surface.

A further object of the invention is to provide a combination folding rule and plumb bob which is of a simple and economical construction.

With these and other objects and advantages in view the invention embodies an elongated casing having a cavity therein and also having a window in one side, a weight adjustably mounted in the casing and adapted to be suspended in the cavity, a clip adapted to be mounted on a section of a folding rule, means for pivotally mounting the casing on the clip, and another clip adapted to be positioned on the section of the folding rule at a point spaced from the clip on which the casing is pivotally mounted.

Other features and advantages of the invention will appear from the following description taken in connection with the drawing, wherein:

Figure 1 is a front elevational view showing the plumb bob mounted on a folding rule with the plumb bob positioned at a right angle in relation to the rule.

Figure 2 is a cross section through the combination rule tool taken on line 2—2 of Fig. 1.

Figure 3 is a detail showing a view looking upwardly toward the under side of the rule and showing the mounting clip for attaching the plumb bob to the section of the rule.

Figure 4 is a detail looking toward the outer face of the attachment with a thumb nut and lock washer omitted, and with the upper part of the attachment broken away.

Figure 5 is a detail looking toward the outer face of the mounting clip and showing notches therein for locating the plumb bob at different angles in relation to the rule.

Figure 6 is a cross section taken on line 6—6 of Figure 2, showing a slot in the inner part of the mounting clip for vertically adjusting the jaws of the clip of the plumb bob attachment.

Figure 7 is a front elevational view similar to that shown in Figure 1, showing the plumb bob casing nested against the face of the end section of a folding rule.

Figure 8 is a front elevational view showing a modification wherein the plumb bob is replaced with spirit level elements, the device being shown with the level in a horizontal position.

Referring now to the drawing wherein like reference characters denote corresponding parts the improved plumb bob attachment of this invention includes an elongated casing 10, rectangular-shaped in cross section, a plumb bob 11 suspended by a cord or wire 12 from an adjusting screw 13 and positioned in a cavity 14 in the casing, a mounting clip having coacting jaws 15 and 16 for securing the device on a section 17 of a folding rule, a leveling clip 18 also slidably mounted on the section 17 of the rule, and a stud 19 mounted in the jaw 16 and extended through the jaw 15 and lower part of the casing for pivotally mounting the casing on the jaws of the clip.

The casing 10 is provided with a transparent panel 20 and the panel 20 is secured in position with a frame 21 that is secured to the face of the casing with screws 22. The lower end of the casing is provided with a point 23 that is positioned to register with a point 24 of the plumb bob 11 with the casing in a vertical position.

The upper end of the plumb bob 11 is provided with a notch 25 in which a knot or upset end of the strand 12 is positioned with the strand extended through an opening in the end of the bob and the screw 13 is provided with a similar notch 26 in which the upper end of the strand 12 is secured with the strand passing through an opening 27 in the lower end of the screw. The upper part of the screw is also provided with a cavity 28, as indicated by the dotted lines in Fig. 2 and as the screw 13 is turned inwardly the knot or upset end of the strand 12 slides upwardly in the cavity 28 whereby the lower end of the plumb bob is adapted to be clamped against the lower part of the casing to prevent rattling of the plumb bob in the casing when the device is not in use. The upper end of the screw 13 is provided with flat sides 29 to facilitate gripping the screw for adjusting the position thereof and the portion of the screw between the flat sides is provided with an opening 30.

The lower end of the casing 10 is provided with a tongue 31 having an opening 32 therethrough through which the stud 19 extends and, as illustrated in Fig. 2, the stud extends through an opening 33 in a flange 34 of the jaw 15, the conical-shaped head 35 of the stud being positioned in a countersunk slot 36 of the flange 37 of the jaw 16, and the outer end of the stud being provided with a thumb nut 38.

The lock washer or cover plate 39 is positioned between the thumb nut 38 and outer face of the tongue 31 and, particularly as shown in Figs. 2 and 4 the tongue is provided with a hub 40 having an arm 41 extended therefrom, the hub being positioned to coact with notches for openings 42 in the flange 34, as shown in Fig. 5 to provide means for locating the casing with the plumb bob at different angles in relation to the rule. A spring 43 is provided in a recess 44 in the hub to urge the hub into the opening 42, as shown in Fig. 2 and with the parts positioned as shown, the hub may be withdrawn by the arm to adjust the position of the casing in relation to the rule.

The lock washer 39 is formed with sufficient resiliency to urge the jaws 15 and 16 into engagement with the section 17 of the rule, thereby providing holding means whereby the casing is adapted to be moved to different positions on the section of the rule.

The rule tool may also be formed as illustrated in Figure 8 with spirit level elements including a horizontally disposed bubble glass 45 and a vertically disposed bubble glass 46 mounted in a casing 47 similar to the casing 10 and, as shown in the drawing, the casing may be adjustably mounted on the stud 19 so that it may be adjusted to different angles, similar to the casing 10.

With the parts formed and assembled in this manner the casing may be set to a desired angle and with the lower surface of the jaw 16 and also the lower surface of the clip 18 positioned against a surface, the angle of the surface may readily be determined and similar angles may be described on different pieces of material.

When not in use, the casing is folded to the position shown in Fig. 7, so that the rule may be carried in a pocket or other container with conventional carpenter's tools.

It will be understood that modifications, within the scope of the appended claims, may be made in the design and arrangement of the parts without departing from the spirit of the invention.

What is claimed is:

1. A plumb bob attachment comprising an elongated casing having a cavity therein and also having a window in one side, a mounting clip having opposed jaws, said jaws being adapted to grip the edges of a rule, means pivotally mounting the casing on said mounting clip whereby the casing is adapted to fold to a nested position against the face of a rule upon which the mounting clip is positioned, notches in the face of one of said jaws, a cover plate in opposed relation to the notches in said jaw, means carried by said cover plate to coact with said notches to retain said casing in varied angular relation to the rule, and a plumb bob suspended in said casing and positioned in the cavity therein.

2. A plumb bob attachment comprising an elongated casing having a cavity therein and also having a window in one side, a mounting clip having opposed jaws, said jaws being adapted to grip the edges of a rule, means pivotally mounting the casing on said mounting clip whereby the casing is adapted to fold to a nested position against the face of a rule upon which the mounting clip is positioned, a plumb bob suspended in said casing and positioned in the cavity therein, and notches in the face of one of said jaws, a cover plate in opposed relation to the notches in said jaws, a spring pressed lug carried by said cover plate to coact with said notches for adjusting the position of the plumb bob in relation to the rule.

3. A plumb bob attachment comprising an elongated casing having a cavity therein and also having a window in one side, a mounting clip having opposed jaws, said jaws being adapted to grip the edges of a rule, means pivotally mounting the casing on said mounting clip whereby the casing is adapted to fold to a nested position against the face of a rule upon which the mounting clip is positioned, a plumb bob suspended in said casing and positioned in the cavity therein, means for adjusting the position of the plumb bob, and notches in the face of one of said jaws, a cover plate in opposed relation to the notches in said jaw, a spring pressed lug carried by said cover plate to coact with said notches for positioning the casing at different angles in relation to a rule upon which the attachment is mounted.

4. A plumb bob attachment comprising an elongated casing having a cavity therein and also having a window in one side, a mounting clip having opposed jaws, said jaws being adapted to grip the edges of a rule, means pivotally mounting the casing on said mounting clip whereby the casing is adapted to fold to a nested position against the face of a rule upon which the mounting clip is positioned, a plumb bob suspended in said casing and positioned in the cavity therein, notches in the face of one of said jaws, a cover plate in opposed relation to the notches in said jaw, a spring pressed lug carried by said cover plate to coact with said notches for adjusting the position of the plumb bob, and a clip also adapted to be mounted on a rule and positioned in spaced relation to said mounting clip, the thicknesses of the lower portions of said clips being equal whereby the lower edge of the rule may be positioned parallel to a surface against which the clips are positioned.

References Cited in the file of this patent

UNITED STATES PATENTS

| | | |
|---|---|---|
| 449,609 | Green | Mar. 31, 1891 |
| 450,457 | Green | Apr. 14, 1891 |
| 588,852 | Beatty | Aug. 24, 1897 |
| 899,269 | Staley | Sept. 22, 1908 |
| 1,459,381 | Von Serkey | June 19, 1923 |
| 1,478,629 | Bartlett | Dec. 25, 1923 |
| 1,635,874 | Wynkoop | July 12, 1927 |
| 1,912,536 | Mobley | June 6, 1933 |
| 2,097,848 | Torbert | Nov. 2, 1937 |
| 2,543,572 | Friberg | Feb. 27, 1951 |
| 2,554,133 | Von Arx | May 22, 1951 |